US012116231B2

(12) United States Patent
Koekebakker et al.

(10) Patent No.: US 12,116,231 B2
(45) Date of Patent: Oct. 15, 2024

(54) SHEET CONVEYOR ASSEMBLY FOR A PRINTER WITH MEDIA TYPE DEPENDENT TRANSFER

(71) Applicant: Canon Production Printing Holding B.V., Venlo (NL)

(72) Inventors: Sjirk H. Koekebakker, Venlo (NL); Johan P. Smits, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 185 days.

(21) Appl. No.: 17/739,729

(22) Filed: May 9, 2022

(65) Prior Publication Data

US 2022/0371842 A1 Nov. 24, 2022

(30) Foreign Application Priority Data

May 21, 2021 (EP) .................................... 21175416

(51) Int. Cl.
*B65H 5/22* (2006.01)
*B41J 11/00* (2006.01)
(Continued)

(52) U.S. Cl.
CPC .......... *B65H 5/224* (2013.01); *B41J 11/0085* (2013.01); *B41J 13/0018* (2013.01);
(Continued)

(58) Field of Classification Search
CPC . B65H 5/224; B65H 7/02; B65H 7/20; B65H 9/002; B65H 9/08;
(Continued)

(56) References Cited

U.S. PATENT DOCUMENTS

2008/0296828 A1* 12/2008 Shoji ........................ B65H 9/10 271/10.12
2013/0277909 A1 10/2013 Ino
(Continued)

FOREIGN PATENT DOCUMENTS

EP 1 624 346 B1 9/2007
EP 3 204 234 B1 12/2018

OTHER PUBLICATIONS

Search Report issued in European priority application 21175416 dated Nov. 17, 2021.

*Primary Examiner* — Prasad V Gokhale
(74) *Attorney, Agent, or Firm* — Birch, Stewart, Kolasch & Birch, LLP

(57) ABSTRACT

A sheet printer includes a sheet conveyor assembly including a first conveyor with a first holding device configured for exerting a holding force on a sheet proportional to a coverage of the sheet on the first conveyor and a second conveyor upstream of the first conveyor including a second holding device configured for holding and releasing the sheet, a print head assembly positioned over the first conveyor, a detector assembly for sensing the transport of the first conveyor, a controller storing on its memory a sheet media catalogue and configured to control a release timing of the second holding device for releasing the sheet partially engaged by the first conveyor based on a media type parameter selected from the media catalogue and to control the print head assembly to commence printing the sheet based on transport information from the detector assembly.

16 Claims, 4 Drawing Sheets

(51) Int. Cl.

| | |
|---|---|
| ***B41J 13/00*** | (2006.01) |
| ***B41J 13/02*** | (2006.01) |
| ***B41J 13/08*** | (2006.01) |
| ***B41J 13/26*** | (2006.01) |
| ***B65H 7/02*** | (2006.01) |
| ***B65H 7/20*** | (2006.01) |
| ***B65H 9/00*** | (2006.01) |
| ***B65H 9/08*** | (2006.01) |

(52) U.S. Cl.
CPC ......... *B41J 13/0027* (2013.01); *B41J 13/025* (2013.01); *B41J 13/08* (2013.01); *B41J 13/26* (2013.01); *B65H 7/02* (2013.01); *B65H 7/20* (2013.01); *B65H 9/002* (2013.01); *B65H 9/08* (2013.01); *B65H 2301/44336* (2013.01); *B65H 2301/44735* (2013.01); *B65H 2406/32* (2013.01)

(58) Field of Classification Search
CPC .... B65H 2301/44336; B65H 2301/447; B65H 2301/44735; B65H 2301/4474; B65H 2404/144; B65H 2404/1441; B65H 2404/1442; B65H 2404/1424; B65H 2406/312; B65H 2406/3124; B65H 2406/32; B65H 2406/321; B65H 2511/10; B65H 2513/50; B65H 2513/512; B65H 2701/1718; B41J 11/007; B41J 11/0085; B41J 13/0018; B41J 13/025; B41J 13/08; B41J 13/26
See application file for complete search history.

(56) References Cited

U.S. PATENT DOCUMENTS

2018/0162147 A1 * 6/2018 Kawashima ............. B41J 13/08
2019/0002224 A1 * 1/2019 Nagata ..................... B65H 7/02

* cited by examiner

SHEET CONVEYOR ASSEMBLY FOR A PRINTER WITH MEDIA TYPE DEPENDENT TRANSFER

BACKGROUND OF THE INVENTION

1. Field of the Invention

The invention relates to a sheet conveyor assembly, a sheet printer comprising such an assembly, a method for transferring sheets between conveyors, a computer-readable storage medium storing instructions, and a memory for storing data.

2. Description of Background Art

In a sheet printer an endless belt conveyor may be positioned over a suction chamber and facing a print assembly to provide a moveable sheet support surface during printing. The conveyor may comprise detectors for sensing the speed, position, and/or orientation of the belt and actuators which actively control the belt to maintain its position constant with respect to the print head assembly. The sheet is generally transferred to the belt in a predetermined position suitable for printing, which position was determined by means of a sheet registration device upstream of the belt conveyor. When transferring the sheet to the belt, undetected displacement may occur between the sheet and the belt, such that the position of the sheet on the belt is uncertain or unknown. The sheet may for example slip over the belt and trail behind its intended position. This could result in misalignment of the image printed on the sheet, as accurate knowledge of the sheet's position is required to timely start the jetting of ink droplets onto the sheet. It is known to eliminate such uncertainty by providing the print head assembly with means for directly sensing the position of the sheet irrespective of the belt. This may reduce productivity as a correction of the sheet's and/or belt's position has to be performed prior to printing. Direct sensing of the sheet may further be difficult to achieve in cases wherein the sheet is transparent or has a similar color and/or material as that of the belt. Additionally, such sensors require additional components, resulting in greater costs.

SUMMARY OF THE INVENTION

It is an object of the invention to provide an alternative sheet conveyor assembly, which allows for accurate transfer of the sheet between conveyors.

In accordance with the present invention, a sheet conveyor for a printer according to claim 1, a sheet printer according to claim 14, a method according to claim 15, and a computer-readable storage medium storing instructions according to claim 17.

The sheet conveyor assembly for a printer comprises:

- a first conveyor with a first holding device configured for exerting a holding force on a sheet proportional to a coverage of the sheet on an endless, air permeable belt of the first conveyor; and
- a second conveyor upstream of the first conveyor comprising:
  - a registration device for adjusting a lateral position and/or orientation of the sheet and a second holding device configured for holding and releasing the sheet, such that the sheet is transferred from the second conveyor to the first conveyor in the lateral position and/or orientation determined by the registration device;
- a controller storing on its memory a sheet media catalogue and configured to control a release timing of the second holding device for releasing the sheet partially engaged by the first conveyor based on a media type parameter selected from the media catalogue. It is the insight of the inventors that undetected displacement of the sheet with respect to the first conveyor occurs due to an insufficient holding force as a consequence of too little coverage of the sheet on the first conveyor at the moment that the sheet is released by the second conveyor. It is the further insight of the inventors that reliable transfer may be achieved by releasing the sheet from the second conveyor after a sufficient amount of coverage on the first conveyor has been achieved. Said amount of coverage varies for different media types, so the inventors propose providing release timing determining means to determine a suitable moment of releasing a sheet in accordance with its media type. This may be achieved by determining a suitable release timing for releasing the sheet from the second conveyor, for example by storing a media type characteristic corresponding to a minimum coverage over the first conveyor which should be achieved by a sheet for any relevant media types, or by means of an algorithm which determines a suitable release timing from other pre-stored characteristics of the media types. This ensures that the second conveyor releases the sheet only after sufficient coverage of and holding by the first conveyor is present. Displacement due to e.g. slippage is prevented and the sheet is transferred to the first conveyor in the same position and orientation as on the second conveyor. The sheet is transferred synchronously with the movement of the first conveyor, such that the position of the sheet may be accurately derived from the first conveyor's transport information (such as its transport velocity). This reduces the need for direct sensing of the sheet on the first conveyor. A reliable and low costs sheet conveyor assembly is thus formed, which allows the print head assembly to be controlled based on transport information from the first conveyor without the need for directly sensing the sheet. Thereby the object of the present invention has been achieved.

More specific optional features of the invention are indicated in the dependent claims.

In an embodiment, the sheet conveyor assembly further comprises a registration device for adjusting a lateral position and/or orientation of the sheet, such that the sheet is transferred from the second conveyor to the first conveyor in the lateral position and/or orientation determined by the registration device. The registration device is configured to position the sheet in a predetermined position with respect to the belt and/or a print head assembly for printing an image on the sheet. The registration device is configured to laterally shift and/or rotate the sheet. To avoid misalignment of the printed image on the sheet, the lateral position and/or orientation of the sheet should be maintained as the sheet is transferred onto the first conveyor. The longitudinal position of the sheet in the transport direction is further accurately tracked to time the arrival of the leading edge of the sheet with the start of the printing of the image, as the sheet moves synchronously with the first conveyor after release.

In an embodiment, the controller is configured to control the release of the sheet from the second conveyor after the holding force of the first conveyor is sufficient to prevent displacement of the sheet with respect to the first conveyor, preferably during and/or after transfer. Displacement of the sheet with respect to the first conveyor is avoided ensuring accurate tracking of the sheet's position by the controller. The sheet's lateral position and orientation have been determined by the registration device and the sheet is transferred to the first conveyor while maintaining said lateral position and orientation. Further, the longitudinal position of the sheet, i.e. its position in the transport direction, was determined and/or set by the registration device. In order to allow the controller to track further progress of the sheet without direct sensing, the sheet should be transported further in a controlled manner. While held by the second conveyor, the longitudinal position of the sheet may be tracked by and/or derived from transport information from the second conveyor. The controller may for example compare a speed of the second conveyor to an elapsed time since last determining the sheet's longitudinal position, for example in the registration device to determine the sheet's current longitudinal position. Similarly, the controller may track progress of the sheet on the first conveyor in a similar manner. This requires the sheet to be controllably handed over from the second to the first conveyor, without the sheet slipping or otherwise moving over the first conveyor after the second conveyor has released the sheet. Preferably the controller controls the first and second conveyors, such that the sheet moves synchronously with the first conveyor. This achieved by suitably timing the release of the second conveyor on or after the moment at which a secure holding of the first conveyor on the sheet is known to have been achieved. This moment may vary for different media types, dependent on their dimensions and materials. The controller's memory thereto stores suitable means for determining this release time upon selection of the applied media type. These means may include a look-up table and/or algorithm which yields a release timing upon selecting and/or inputting a certain media type for a sheet.

In an embodiment, the sheet is positioned on both the first and second conveyors when the controller controls the second conveyor to release the sheet. The release is performed while the sheet is still partially on or over the second conveyor. The second conveyor comprises preferably a holding device for actively holding the sheet, for example a transport pinch formed of opposing rollers, which can be moved apart from one another to release the sheet. At the moment of the release timing, the controller controls the holding device to release the sheet, which at that time is securely held by the first conveyor, such that the sheet is further transported synchronously with the first conveyor. It will be appreciated that dependent on the distance between the holding device of the second conveyor and the first conveyor certain shorter sheets may have passed or exited the holding device of the second conveyor before the determined release timing. Therefore, the holding device of the second conveyor is preferably adjacent or near the first conveyor.

In an embodiment, the controller comprises release timing determining means to derive the release timing from the selected media type parameter. The release timing determining means yield a release timing when a media type parameter is input or selected. The media type parameter has been determined when the sheet arrives the second conveyor. The media type parameter may be input via the user interface or as part of a print job prescribing the use of a certain media type. The release timing determining means apply the media type parameter to determine or derive the release timing belonging to a sheet of the respective media type. In another embodiment, the release timing determining means comprise a predetermined release timing or length parameter for each of media type in the media catalogue and/or an algorithm configured to derive release timing parameter from other predetermined, prestored characteristics for each of media type in the media catalogue, preferably a sheet dimension characteristic and/or a sheet air permeability characteristic. The release timing determining means may comprise a look-up table or list storing predetermined release timing properties per media type, for example as part of the media catalogue. Selection of the media type then automatically includes a selection of the respective release timing properties via the look-up table. The releases timing properties may be expressed as a point or position on the first conveyor, a time or distance measured from e.g. the arrival of the sheet at the first conveyor or any other suitably point, etc. The release timing determining means may further comprise an algorithm which determines or calculates a value for the release timing parameter for a media type based on one or more media characteristics in the media catalogue.

In an embodiment, the release timing determines a coverage of the sheet over the first conveyor, preferably wherein the coverage is proportional to a sheet dimension characteristic and/or a sheet air permeability characteristic. The holding force of the first conveyor is proportional to its coverage by the sheet. A sheet with a greater air permeability but similar dimensions will in most cases require a larger coverage to achieve the same secure holding on the first conveyor as a sheet with lower or zero air permeability. Sheets of the same material but with different dimensions may require different release timings to achieve sufficient coverage for a secure holding on the first conveyor.

In an embodiment, the sheet conveyor assembly further comprises a detector assembly for sensing the transport of the first conveyor, preferably a belt tracking sensor assembly. The progress of the sheet, specifically its arrival at the print head assembly, is determined by the controller from transport information generated by the detector assembly, specifically by the belt tracking sensor assembly. Since the handover of the sheet between the first and second conveyor was performed with accurate knowledge of the sheet's position, it is possible to determine the sheet's arrival at the print head assembly by detecting the movement of the belt. This allows the print head assembly to be controlled with the correct timing to position the image on the intended position on the sheet. The detector assembly may be formed of an optical detector configured to detect markers on or in the belt at different positions and/or comprise one or more encoders positioned at the belt, at one or more of its rollers, and/or at its drive In another embodiment, the first conveyor comprises on the belt a moveable sheet support surface onto which the sheet is at least partially held while on the first conveyor. The belt forms a sheet support surface and the holding device is provided for holding the sheet against the belt. Such holdings means may be pressing means or electrostatic attractors, or preferably a suction chamber connected to a suction source for drawing in air through through-holes in the belt.

In an embodiment, the second sheet conveyor comprises a releasable holding device having a first state, wherein the sheet is actively held against a support surface of the second conveyor and a second state wherein the sheet is freely supported on the support surface of the second conveyor. The second conveyor comprises a holding device such as a pressing means, a suction source, electrostatic attractors, etc. which can controlled to whether or not actively hold the sheet against the support surface. The second conveyor comprises a transport pinch comprising at least one roller moveable in a direction perpendicular to a plane of the sheet away from the sheet on the second conveyor for releasing the sheet from the second conveyor. The roller can be moved to a remote position away from the support force to bring the holding device in the second state. In the first state the roller presses the sheet onto the support surface, which may be formed by one or more rollers, a support plate, etc. Preferably, the roller is part of the registration device, wherein the roller is opposite one or more independently driveable wheels or rollers for adjusting a lateral position and/or orientation of the sheet.

The present invention further relates to a sheet printer comprising the sheet conveyor assembly according to the present invention, wherein a print head assembly is positioned over the first conveyor and further comprising a detector assembly for sensing the transport of the first conveyor and a controlled configured to control the print head assembly to commence printing the sheet based on transport information from the detector assembly. The printer is preferably an inkjet printer with a controller which is able to accurately track further progress of the sheet beyond a point upstream of the first conveyor, at which point the sheet's position was determined or known. No additional direct sensing of the sheet beyond that point is required, since the sheet is controllably transferred to the first conveyor, such that the current position of the sheet can be accurately derived from the transport information from the detector assembly.

The present invention further relates to a method for transferring sheets having a predetermined position and/or orientation from a second conveyor to first conveyor, comprising the steps of:

- determining a release timing for a sheet of a certain media type;
- while transferring the sheet between the conveyor, controlling the downstream conveyor to release its holding force on the sheet in correspondence with the determined release timing, thereby allowing the upstream conveyor to determine further progress of the sheet.

When a sheet is transferred between two conveyors, the holding force of the first conveyor should be sufficiently large to prevent slippage between the sheet and the first conveyor before the second conveyor releases the sheet. On the second conveyor progress of the sheet is determined by the first conveyor, which allows the sheet's position to be determined based on transport information from the second conveyor. Further progress of the sheet on the first conveyor can only be accurately tracked from transport information of the first conveyor if the sheet is controllable transferred between the conveyors, i.e. without displacement of the sheet with respect to the first conveyor after the second conveyor releases the sheet. This is ensured by determining a suitable release timing for each media type applied. This determination is preferably performed by the printer's controller based on the input or selection of a certain media type. The sheet is released from the second conveyor on or after the determined release timing, for example after passing a predetermined length from the upstream end of the first conveyor. The release timing for each media type is selected, such that the holding force of the first conveyor is sufficiently great to prevent displacement or slippage between the sheet and the first conveyor after release. This allows the progress of the sheet towards the print head assembly to be accurately derived from the transport information of the first and second conveyors, such that the print head assembly can be controlled based thereon to position the image on the sheet at the intended position.

In an embodiment, the method further comprises the step of determining the release timing comprises determining a parameter corresponding to a minimal coverage of the sheet over the first conveyor, and wherein the second conveyor is controlled to release its holding on the sheet when said minimal coverage has been exceeded and/or reached. As indicated above, the release timing is a measure for the minimum amount of coverage a sheet of a certain media has to attain on the first conveyor to achieve secure holding.

The present invention further relates to a computer-readable storage medium storing instructions that when executed by a computer cause the computer to perform a method for using a computer system to print an image on a sheet, the method comprising:

- receiving a selected media type parameter;
- receiving transport information from a first sheet conveyor positioned facing a print head assembly and positioned downstream of a second sheet conveyor;
- determining a release timing for a sheet from said media type parameter;
- while transferring a sheet between said two conveyors in a printer, controlling the upstream conveyor to release its holding force on the sheet in accordance with the release timing, thereby allowing the downstream conveyor to determine further progress of the sheet; and
- controlling a print head assembly to commence printing on the sheet based the transport information from the downstream sheet conveyor.

The instructions instruct the computer to determine a release timing for a sheet of a certain media type based on said media type. The media type parameter is selected in correspondence to the media type of the applied sheets for a print job. The sheet is transferred from the second conveyor to the first conveyor with a predetermined position. By determining an appropriate release timing for releasing the sheet from the second conveyor, it is prevented that the position of the sheet shifts with respect to the first conveyor. The further progress of the sheet can then be derived from position transport information of the first conveyor in combination with the determined position of the sheet at the moment of release. This allows the sheet's progress towards the print head assembly to be tracked without directly sensing the sheet itself. Based on said progress, the print head assembly is controlled to timely commence printing on the sheet in order to correctly position the image on the sheet.

The present invention further relates to a memory for storing data for access by an application program being executed on a data processing system, comprising: a data structure stored in the memory, the data structure including information resident in a database used by the application program and including:

- a first data object configured to identify a media type for a plurality of different media types for a sheet to be printed in a printer;
- a second data object configured to upon selection of the media type of the first data object determine a release length or timing for, while transferring a sheet between two conveyors in a printer, controlling the upstream conveyor to release its holding force on the sheet in accordance with the release timing or length, thereby allowing the downstream conveyor to determine further progress of the sheet. The data structure includes a media catalogue, which comprises data objects that allow a media type of sheet top be determined or selected. The data structure further comprises a corresponding release timing or length data object for each media type object.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
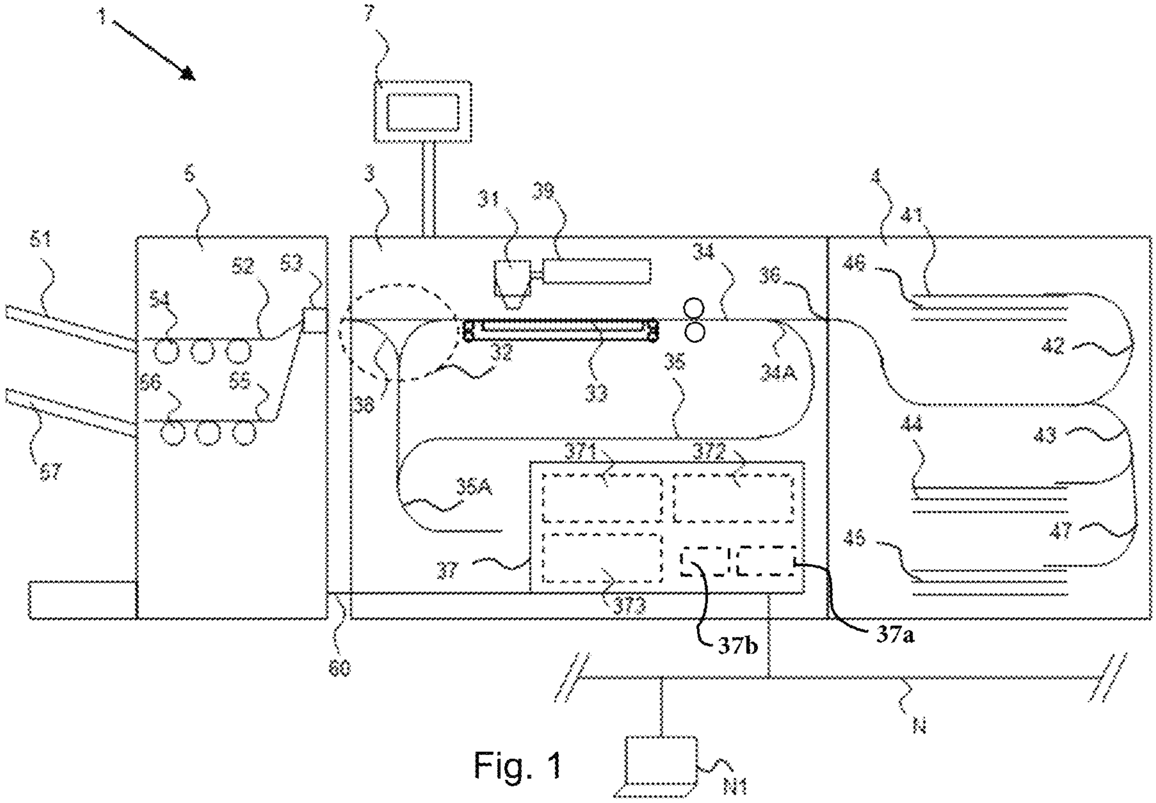
FIG. 1 is a schematic cross-sectional view of a printer according to the present invention comprising a sheet conveyor assembly.

The present invention will now be described with reference to the accompanying drawings, wherein the same reference numerals have been used to identify the same or similar elements throughout the several views.

FIG. 1 shows schematically an embodiment of a printer 1 according to the present invention. The printer 1, for purposes of explanation, is divided into an output section 5, a print engine and control section 3, a local user interface 7 and an input section 4. While a specific printer is shown and described, the disclosed embodiments may be used with other types of printer such as an ink jet print system, an electrographic print system, etc.

The output section 5 comprises a first output holder 52 for holding printed image receiving material, for example a plurality of sheets. The output section 5 may comprise a second output holder 55. While 2 output holders are illustrated in FIG. 1, the number of output holders may include one, two, three or more output holders. The printed image receiving material is transported from the print engine and control section 3 via an inlet 53 to the output section 5. When a stack ejection command is invoked by the controller 37 for the first output holder 52, the controller including a memory 37*a*, first guiding means 54 are activated in order to eject the plurality of sheets in the first output holder 52 outwards to a first external output holder 51. When a stack ejection command is invoked by the controller 37 for the second output holder 55, second guiding means 56 are activated in order to eject the plurality of sheets in the second output holder 55 outwards to a second external output holder 57.

The output section 5 is digitally connected by means of a cable 60 to the print engine and control section 3 for bi-directional data signal transfer.

The print engine and control section 3 comprises a print engine and a controller 37 for controlling the printing process and scheduling the plurality of sheets in a printing order before they are separated from input holder 44, 45, 46.

The controller 37 is a computer, a server or a workstation, connected to the print engine and connected to the digital environment of the printer, for example a network N for transmitting a submitted print job to the printer 1. In FIG. 1 the controller 37 is positioned inside the print engine and control section 3, but the controller 37 may also be at least partially positioned outside the print engine and control section 3 in connection with the network N in a workstation N1.

The controller 37 comprises a print job receiving section 371 permitting a user to submit a print job to the printer 1, the print job comprising image data to be printed and a plurality of print job settings. The controller 37 comprises a print job queue section 372 comprising a print job queue for print jobs submitted to the printer 1 and scheduled to be printed. The controller 37 comprises a sheet scheduling section 373 for determining for each of the plurality of sheets of the print jobs in the print job queue an entrance time in the paper path of the print engine and control section 3, especially an entrance time for the first pass and an entrance time for the second pass in the loop in the paper path according to the present invention. The sheet scheduling section 373 will also be called scheduler 373 hereinafter.

The sheet scheduling section 373 takes the length of the loop into account. The length of the loop corresponds to a loop time duration of a sheet going through the loop dependent on the velocity of the sheets in the loop. The loop time duration may vary per kind of sheet, i.e. a sheet with different media properties.

Resources may be recording material located in the input section 4, marking material located in a reservoir 39 near or in the print head or print assembly 31 of the print engine, or finishing material located near the print head or print assembly 31 of the print engine or located in the output section 5 (not shown).

The paper path comprises a plurality of paper path sections 32, 33, 34, 35 for transporting the image receiving material from an entry point 36 of the print engine and control section 3 along the print head or print assembly 31 to the inlet 53 of the output section 5. The paper path sections 32, 33, 34, 35 form a loop according to the present invention. The loop enables the printing of a duplex print job and/or a mix-plex job, i.e. a print job comprising a mix of sheets intended to be printed partially in a simplex mode and partially in a duplex mode.

The print head or print assembly 31 is suitable for ejecting and/or fixing marking material to image receiving material. The print head or print assembly 31 is positioned near the paper path section 34. The print head or print assembly 31 may be an inkjet print head, a direct imaging toner assembly or an indirect imaging toner assembly.

While an image receiving material is transported along the paper path section 34 in a first pass in the loop, the image receiving material receives the marking material through the print head or print assembly 31. A next paper path section 32 is a flip unit 32 for selecting a different subsequent paper path for simplex or duplex printing of the image receiving material. The flip unit 32 may be also used to flip a sheet of image receiving material after printing in simplex mode before the sheet leaves the print engine and control section 3 via a curved section 38 of the flip unit 32 and via the inlet 53 to the output section 5. The curved section 38 of the flip unit 32 may not be present and the turning of a simplex page has to be done via another paper path section 35.

In case of duplex printing on a sheet or when the curved section 38 is not present, the sheet is transported along the loop via paper path section 35A in order to turn the sheet for enabling printing on the other side of the sheet. The sheet is transported along the paper path section 35 until it reaches a merging point 34A at which sheets entering the paper path section 34 from the entry point 36 interweave with the sheets coming from the paper path section 35. The sheets entering the paper path section 34 from the entry point 36 are starting their first pass along the print head or print assembly 31 in the loop. The sheets coming from the paper path section 35 are starting their second pass along the print head or print assembly 31 in the loop. When a sheet has passed the print head or print assembly 31 for the second time in the second pass, the sheet is transported to the inlet 53 of the output section 5.

The input section 4 may comprise at least one input holder 44, 45, 46 for holding the image receiving material before transporting the sheets of image receiving material to the print engine and control section 3. Sheets of image receiving material are separated from the input holders 44, 45, 46 and guided from the input holders 44, 45, 46 by guiding means 42, 43, 47 to an outlet 36 for entrance in the print engine and control section 3. Each input holder 44, 45, 46 may be used for holding a different kind of image receiving material, i.e. sheets having different media properties. While 3 input holders are illustrated in FIG. 1, the number of input holders may include one, two, three or more input holders.

The local user interface 7 is suitable for displaying user interface windows for controlling the print job queue residing in the controller 37. In another embodiment a computer N1 in the network N has a user interface for displaying and controlling the print job queue of the printer 1.

Figure 2:
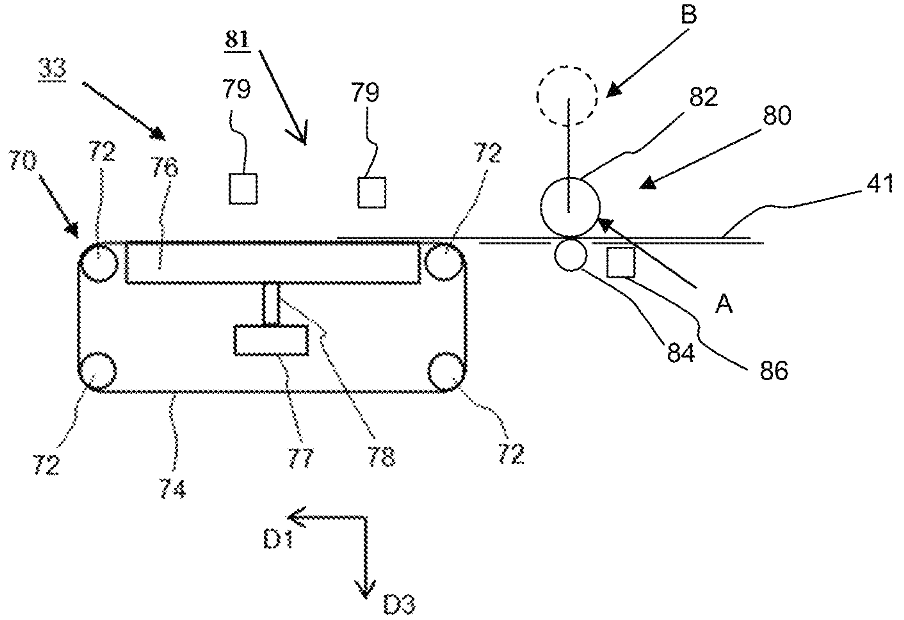
FIG. 2 is a schematic cross-sectional view of the sheet conveyor assembly in FIG. 1.

FIG. 2 shows a schematic cross-sectional view of a first conveyor 70 positioned at the paper path section 33. The first conveyor 70 comprises a plurality of rollers 72 which support and drive an endless conveyor belt 74. At least one of the rollers 72 is provided with a drive or motor for driving the belt 74. The belt 74 is permeable to gas, specifically to air, to apply an underpressure to a sheet 41 of an image receiving member positioned on the belt 74. The sheet 41 is thereby held in position against the belt 74. Generally, the belt 74 is or has been aligned with respect to the print head assembly 31. A belt detector 79 is provided to detect movement of the belt 74, specifically its velocity, lateral position, and/or orientation with respect to the print head assembly 31. In FIG. 2, the belt detector 79 is formed as a belt tracking sensor assembly 81 (see FIG. 2) to include a plurality of optical detectors 79 positioned at different longitudinal positions along the belt 74 in the transport direction D1. By detecting markers, such as perforations or indicators at two or more different points, the velocity, lateral position, and/or orientation of the belt 74 may be derived. Other types of detectors, such as encoders may also be applied.

The belt 74 is provided with a matrix of through-holes to draw in air through the belt 74. The belt 74 is positioned above a suction chamber 76 which is connected to a suction source 77, such as a pump or fan, via line 78. It will appreciated that the suction source 77 may be positioned remote from the suction chamber 76 by extending the line 78. To achieve good image quality the sheet 41 should be flatly positioned below the print head assembly 31. This prevents any irregularities in the sheet 41 from resulting in print artifacts. It further allows for a narrow print gap between the print head assembly 31 and the sheet 41, which allows for more accurate ink droplet positioning. Means for holding the sheet 41 onto the belt 74 other than suction may be applied for holding the sheet 41 onto the belt 74, such as mechanical pressing means, electrostatic charges, etc. A different conveyor type may further be applied instead of the endless belt 74, for example a plurality of stationary rollers, wheels, or other low friction transport devices combined with e.g. suction chambers, which allow for transport while holding the sheet 41 in its relative position.

Figure 3:
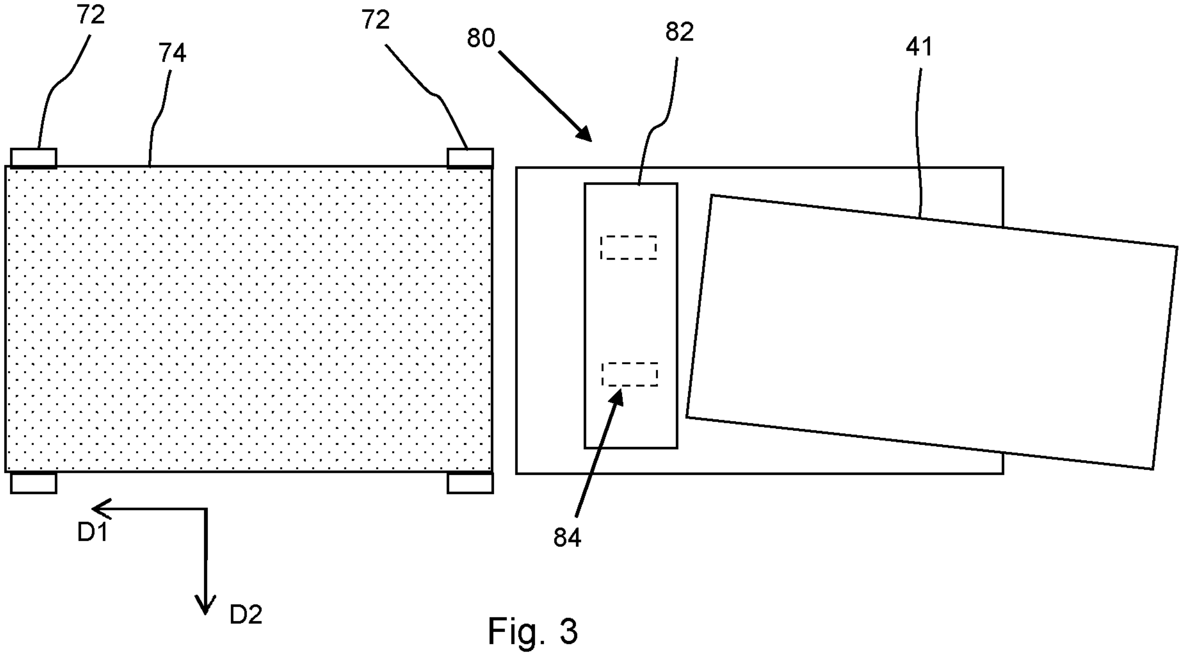
FIG. 3 is a schematic top down view of the sheet conveyor assembly in FIG. 1 in the step of receiving an unregistered sheet.

Upstream of the first conveyor 70, the second conveyor 80 is positioned. The second conveyor 80 is formed of a transport pinch 82 in combination with a sheet guide, which in FIG. 2 is formed as a guide plate which supports the sheet 41. The transport pinch 80 comprises a holding device formed of opposing rollers 82, 84. As shown in FIG. 3, the bottom rollers 84 are formed as laterally spaced apart wheels 84, while the upper roller 82 is formed of a longer and/or larger cylinder. One of the rollers 82, 84 is drivable by means of a drive or motor (not shown) to transport the sheet 41 further along in the transport direction D1. To drive the sheet 41, the rollers 82, 84 are positioned in an adjacent position A, which ensures sufficient engagement of the sheet 41 by the driven roller 82. 84. This position is generally referred as the “closed” position A. The rollers 82, 84 are further moveable with respect to one another into a remote position B, which is commonly referred as the “open” position. In FIG. 2, the upper roller 82 is moveably mounted on a support and provided with an actuator for moving the roller 82 between position A and position B. Different means for actuating the rollers 82, 85 between the positions A, B may be applied, such as pivots, hinges, linear actuators, etc. In the open position B, the sheet 41 is substantially released from any holding force exerted on it by the second conveyor 80. In practice, some minor frictional forces may remain where the sheet 41 is supported by second conveyor 80, though these forces are significantly less than the holding force of the second conveyor 80 with the rollers 82, 84 in the closed position A.

The second conveyor 80 further comprises a registration 84 device for laterally shifting and/or rotating the sheet 41. In FIGS. 2 to 6 the registration device 84 is formed by a plurality of individually drivable wheels or rollers 84. The rollers 84 are spaced in the lateral direction D2 and positioned sufficiently adjacent in the transport direction D1 to simultaneously engage the sheet 41. The orientation and/or position of a sheet 41 is determined by means of a sheet detector 86, which may be configured to detect passage of the sheet 41 along a predetermined point or points in the transport path. The sheet detector 86 in FIG. 2 preferably comprises a pair of stationary optical sensors for detecting passage of the sheet 41 along the sensors at at least two different points. This allows the controller 37 to derive the sheet’s position in the transport direction D1, its rotational orientation, and/or its lateral position. By controlling one roller 84 to rotate at a different velocity than the other roller 84, the sheet 41 may be rotated. Similarly, the sheet 41 may laterally shifted, for example by consecutive rotations which involve a lateral shift, but which cancel each other out in an angular direction measured around an axis in the perpendicular direction D3. The rollers 84 may further be independently rotatable around axes in the perpendicular direction D3 for improved control over the sheet registration. It will be appreciated that the sheet sensors 86 may be positioned to allow the controller 37 to track the repositioning and/or re-orientation of the sheet 41 during its registration, for example by positioning optical sensors downstream of the rollers 82, 84. Different registration devices may be applied, such as a longitudinal guide block positioned at a lateral side of the second conveyor at the desired lateral position of the sheet 41, wherein the sheet 41 is rotated into the desired orientation via contact with the guide block. It will further be appreciated that the registration device 84 may be provided separate from the sheet conveyor 80, such that the registration is performed at a different position than where the holding force of the second conveyor 80 is applied.

Figure 4:
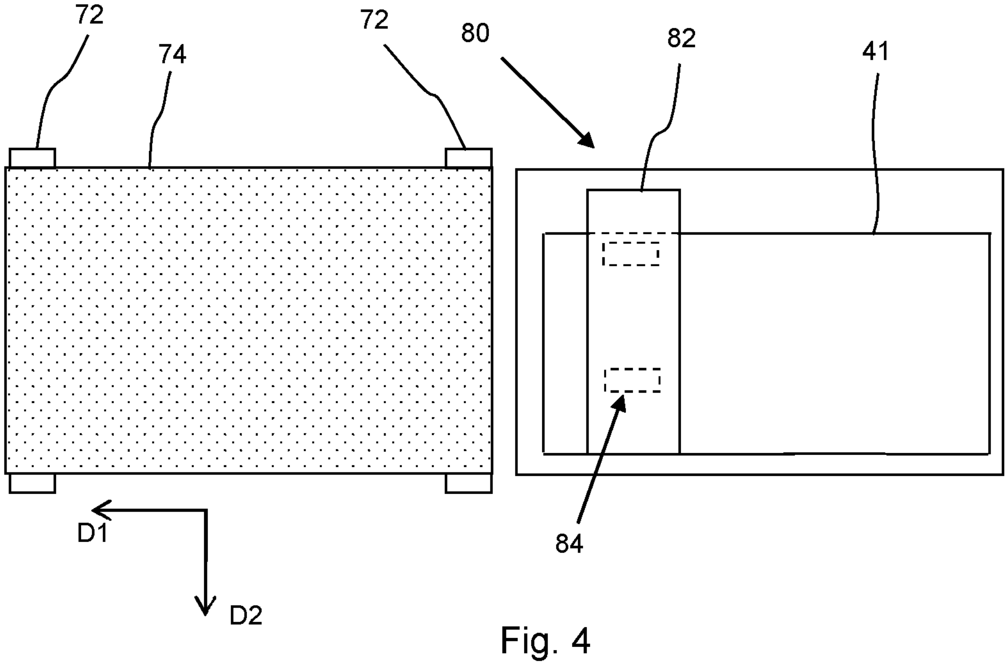
FIG. 4 is a schematic top down view of the sheet conveyor assembly in FIG. 1 in the step of registering the sheet.

FIGS. 3 to 6 illustrate the steps of transferring a sheet between conveyors 70, 80 according to an embodiment of the present invention. The steps are further schematically indicate in the diagram in FIG. 7. In step i, shown in FIG. 3, the sheet 41 of a certain media type is received by the second conveyor 80, which determines the position and orientation of the sheet 41 using the sensors 86. In FIG. 1 the sheet 41 is skewed with respect to the print head assembly 31 and should be repositioned into the desired alignment with respect to the print head assembly 31. Step i further includes registering the sheet 41. The sheet 41 in FIG. 4 is engaged and held by the second conveyor 80, which allows the second conveyor 80 to drive the sheet 41 forward, and to adjust the position and/or orientation of the sheet 41 to achieve the registered state shown in FIG. 4. In the registered state the sheet 41 is suitably positioned with respect to the print head assembly in the lateral direction D2. The second conveyor 80 in its "closed" position A transports the sheet 41 in its registered state onto the first conveyor 70 at a predetermined speed, such that the controller 37 is able to accurately track the position of the sheet 41 in the transport direction D1. It will be appreciated that while the sheet 41 is held by the rollers 82, 84 further progress of the sheet 41 on the second conveyor 80 beyond the point of the sensors 86 may be derived from transport information sent from the second conveyor 80 to the controller 37. For example, by sensing a position of a lateral and/or longitudinal edge of the sheet 41 may be sensed by the sensors 86. The position information is sent to the controller, which is able to determine further progress of the sheet by receiving transport information, such as velocity and/or direction, from the rollers 82, 84. Thereby, after registration, the position of the leading edge of the sheet can be derived from the transport information from the second conveyor 80 up to the moment the second conveyor 80 releases its hold on the sheet 41 by moving the roller 82 to position B. Before said release, the sheet 41 is partially transferred to onto the first conveyor 70.

Figure 5:
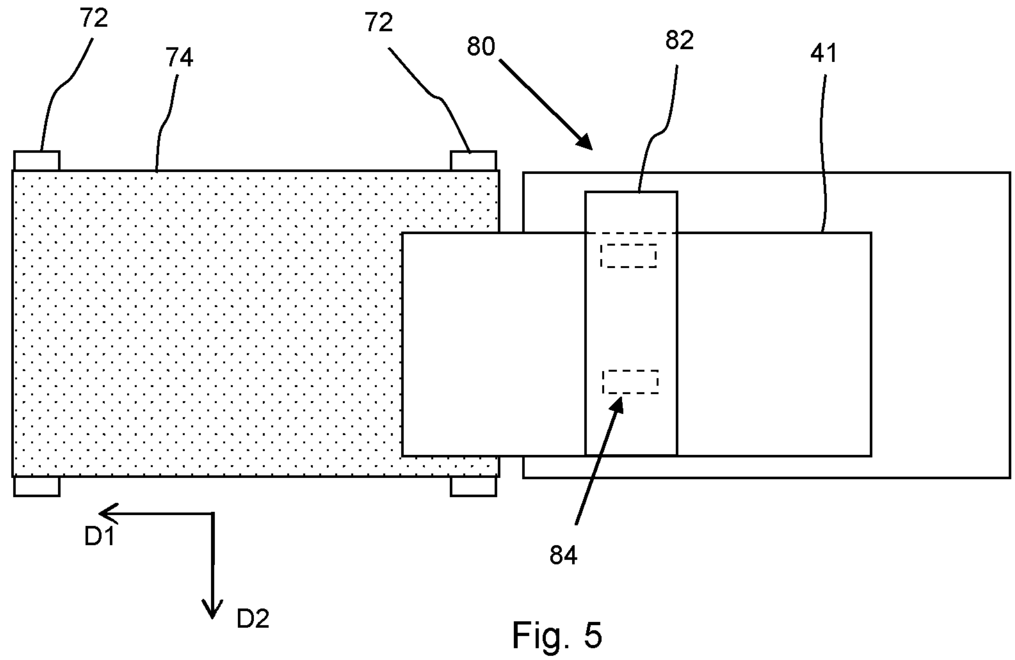
FIG. 5 is a schematic top down view of the sheet conveyor assembly in FIG. 1 in the step of transferring the sheet between conveyors.

As shown in FIG. 5, the sheet 41 is in step ii transferred onto the first conveyor 70 while still being held and transported by the second conveyor 80. The controller 37 controls the first and second conveyors 70, 80 at substantially identical transport velocities. The second 80 drives the sheet 41 onto the first conveyor 70, such that the leading edge of the sheet 41 moves synchronously with the belt 74. Initially, the first conveyor 70 will not exert any holding force on the sheet 41, specifically while the leading edge of the sheet 41 is still over the upstream roller 72. As the leading edge of the sheet 41 is pushed by the second conveyor 80 beyond the upstream roller 72, the sheet is partially positioned over the suction chamber 76, which exerts an underpressure on the sheet 41. The holding force applied by the underpressure increases as the sheet's coverage over the suction box 76 increases. This is in part to the increasing area to which the underpressure is applied and/or to a reduction of air leaking into the suction chamber 76 through uncovered portions of the belt 74. The position of the sheet 41 with respect to the print head assembly 31 was determined by the controller 37 initially from transport information from the second conveyor 80 and the sensed position information from the sensors 86. The controller 37 is further able to derive further progress of the sheet 41 after transfer to the first conveyor 70, from transport information from the first conveyor 70, for example from the belt detector 79. This requires however that the sheet 41 moves synchronously with the belt 74 after the sheet 41 is released from the rollers 82, 84, as otherwise the actual position of the sheet 41 trails behind the sheet position determined by the controller 37 from the transport information of the first conveyor 70. An early release of the sheet 41 could however result in an insufficient holding force of the first conveyor at the initial stage of transfer, causing the belt 74 to slip with respect to the sheet 41, thereby causing a discrepancy between the sheet position as derived from the belt transport information and the actual sheet position. This is avoided by the controller 37 determining a release timing for the second conveyor 80. To prevent displacement of the sheet 41 after release from the second conveyor 80, the release is timed to occur only after a sufficiently large holding force of the first conveyor 70 on the sheet 41 has been achieved.

Figure 6:
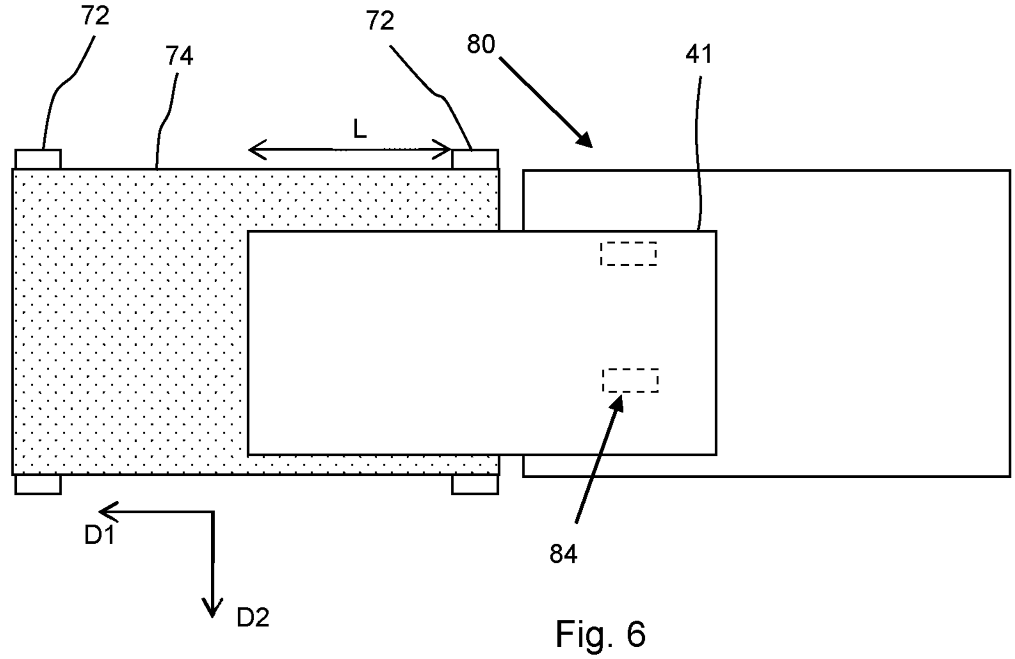
FIG. 6 is a schematic top down view of the sheet conveyor assembly in FIG. 1 in the step of the second conveyor releasing the sheet.
Figure 7:
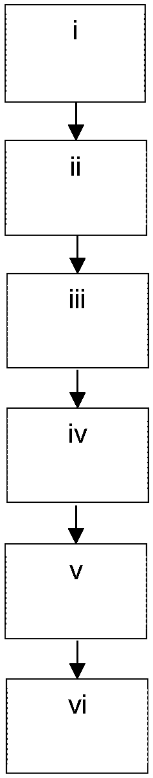
FIG. 7 is a schematic diagram of the steps of shown in FIGS. 1 to 6.

The controller 37 has determined a media type parameter (90A in FIG. 8), corresponding to a media type of the respective sheet 41. The media type parameter 90A is selected from the media catalogue 90, for example from information in the print job, via the user interface 7 when re-supplying the input section 4, or via automatic media type detection means provided e.g. at the input section 4. The media catalogue 90 defines for each media type 90A a plurality of characteristics 90B-90E, such as a factors indicative of sheet length 90B, sheet width 90C, sheet thickness, air permeability 90D, sheet weight, material density, and/or grammage. Additional characteristics may be included and/or above described factors may be expressed through different properties. In the example in FIG. 8, the media catalogue further comprises a pre-stored release time or length characteristic 90E for each media type 90A. The pre-stored release time or length characteristic 90E defines a release point on the first conveyor 70 in the longitudinal direction beyond which the holding force from the suction chamber 76 on the sheet 41 should be sufficient to avoid slippage between said sheet 41 and the belt 74, for the respective media type of the sheet 41. When a media type 90A has been selected, the controller 37, including release timing determining means 37*b* (see FIG. 1), in step iii retrieves the respective release time or length characteristic 90E from the media catalogue 90. In the example, of FIG. 6, the controller 37 determines in this manner a release length L measured from the upstream end of the suction box 76. By tests or calculations, it was determined that when the leading edge of the sheet 41 has passed beyond said release length L, the coverage of the sheet 41 on the suction chamber 76 or belt 74 is sufficient to achieve a secure holding force of the first conveyor 70 on the sheet 41. Slipping of the sheet 41 with respect to the sheet support surface of the belt 74 is thereby reduced or even prevented. The step iv of the roller 82 releasing the sheet 41 is illustrated in FIG. 6. The controlled handover allows the controller 37 in step v to accurately derive the sheet position from the transport information of the first conveyor 70 after release. Consequently, the controller 37 in step vi is able to suitably control the jetting timing of the print head assembly 31 in accordance with the arrival of the leading edge of the sheet 41 at the print head assembly 31. This allows for an accurate positioning of the printed image on the sheet 41 without additional sheet position sensors at the first conveyor 70. It will be appreciated that the controller 37 may in another embodiment comprise an algorithm, which determines the release length or time characteristic from other properties of each media type stored in the media catalogue 90, for example the sheet length 90B, sheet width 90C, and sheet air permeability 90D.

Figure 8:
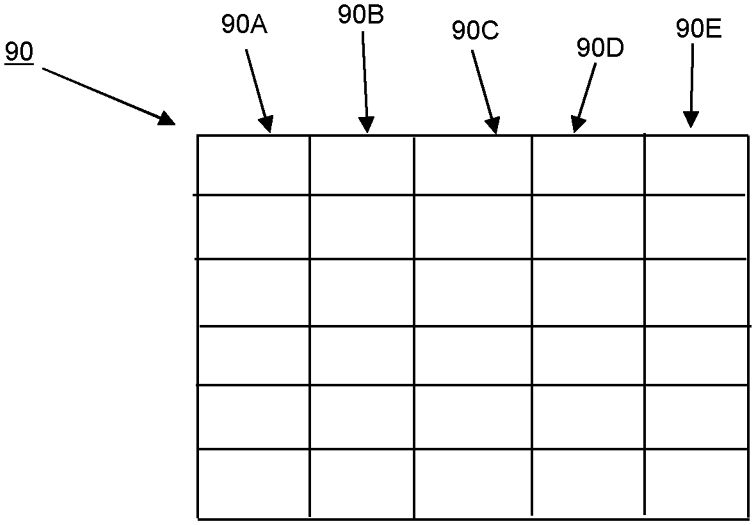
FIG. 8 is a schematic representation of a media catalogue data structure storing a corresponding release timing data object for each media type data object.

It will be appreciated that the media catalogue 90 in FIG. 8 may comprise prestored release time or length characteristics 90E for each media type. Additionally or alternatively, the pre-stored release time or length characteristics 90E may be determined and/or adjusted during operation by performing a calibration for a media type. For example, a sheet 41 of certain media type may be engaged by the second conveyor 80 and the first conveyor 70, while purposely the traction of the first conveyor 70 with respect to that of the second conveyor 80 is varied to determine when the first conveyor 70 begins to securely hold the sheet 41. The coverage of the sheet 41 on the first conveyor 70 may be increased by moving the sheet 41 further onto the first conveyor 70. The second conveyor still engages the sheet 41 as well and the progress of the sheet 41 is tracked via the sheet detector 86. Initially when coverage on the first conveyor 70 is low, the sheet 41 slips over the first conveyor 70. At a certain level of coverage the sheet 41 becomes securely held by the first conveyor 70 without slippage, at which point the first conveyor 70 begins to pull on the portion of the sheet 41 still held by the second conveyor 80. The moment can be detected by e.g. a suitable sensor provided on the second conveyor 80, such as an encoder to derive the torque exerted by the conveyor motor. Alternatively, the first conveyor 70 may be driven at a different speed than the second conveyor 80, and when the first conveyor 70 begins to dominate the sheet's transport, this can be derived from the sheet sensor 86. The velocity of the sheet 41 on the second conveyor 80 then differs from the speed at which the second conveyor 80 is driven. As such a release time or length characteristics 90E can be determined for new and/or known media types. It will further be appreciated that a suitable safety margin or factor may be applied to the determined release time or length characteristics 90E.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A sheet conveyor assembly for a printer, comprising:

a first conveyor with a first holder configured for exerting a holding force on a sheet proportional to a coverage of the sheet on an endless, air permeable belt of the first conveyor;

a second conveyor upstream of the first conveyor comprising a registration device for adjusting a lateral position and/or orientation of the sheet and a second holder configured for holding and releasing the sheet, such that the sheet is transferred from the second conveyor to the first conveyor in a lateral position and/or orientation determined by the registration device; and a controller storing on a memory thereof a sheet media catalogue, the controller being configured to control a release timing of the second holder for releasing the sheet partially engaged by the first conveyor based on a media type parameter selected from the media catalogue.

2. The sheet conveyor assembly according to claim 1, wherein the endless, air permeable belt is positioned over a suction chamber in connection to a suction source for applying an underpressure to at least a portion of the sheet on the first conveyor.

3. The sheet conveyor assembly according to claim 2, wherein the second conveyor comprises a transport pinch comprising a pair of opposing rollers as part of both the registration device and the second holder, at least one of the pair of opposing rollers being moveable in a direction perpendicular to a plane of the sheet away from the sheet on the second conveyor for releasing the sheet from the second conveyor.

4. The sheet conveyor assembly according to claim 3, wherein the controller is configured to control the release of the sheet from the second conveyor after the holding force of the first conveyor is sufficient to prevent displacement of the sheet with respect to the first conveyor.

5. The sheet conveyor assembly according to claim 4, wherein the sheet is positioned on both the first and second conveyors when the controller controls the second conveyor to release the sheet.

6. The sheet conveyor assembly according to claim 4, wherein the controller controls the first and second conveyors, such that the sheet moves synchronously with the first conveyor at least after release.

7. The sheet conveyor assembly according to claim 3, wherein the controller comprises release timing determining means to derive the release timing from the selected media type parameter.

8. The sheet conveyor assembly according to claim 7, wherein the release timing determining means comprise a predetermined release timing or length parameter for each of the media type parameters in the media catalogue and/or an algorithm configured to derive the release timing or length parameter from other predetermined, prestored characteristics for each of the media type parameters in the media catalogue.

9. The sheet conveyor assembly according to claim 8, wherein the release timing determining means determines a coverage of the sheet over the first conveyor.

10. The sheet conveyor assembly according to claim 9, wherein the coverage is proportional to a sheet dimension characteristic and/or a sheet air permeability characteristic.

11. The sheet conveyor assembly according to claim 8, wherein the predetermined, prestored characteristics for each of the media type parameters in the media catalogue include a sheet dimension characteristic and/or a sheet air permeability characteristic.

12. The sheet conveyor assembly according to claim 3, further comprising a detector assembly for sensing the transport of the first conveyor, wherein the controller is configured to control the print head assembly to start printing based on transport information from the detector assembly.

13. The sheet conveyor assembly according to claim 12, wherein the detector assembly comprises a belt tracking sensor assembly.

14. The sheet conveyor assembly according to claim 3, wherein the second holder of the second conveyor has a first state, wherein the sheet is actively held against a support surface of the second conveyor and a second state wherein the sheet is freely supported on the support surface of the second conveyor.

15. The sheet conveyor assembly according to claim 2, wherein the first conveyor comprises on the belt a moveable sheet support surface onto which the sheet is at least partially held while on the first conveyor.

16. A sheet printer comprising the sheet conveyor assembly according to claim 1, wherein a print head assembly is positioned over the first conveyor and further comprising a detector assembly for sensing the transport of the first conveyor and the controller configured to control the print head assembly to commence printing the sheet based on transport information from the detector assembly.

* * * * *